(12) United States Patent
Lignon (10) Patent No.: US 11,486,708 B2
(45) Date of Patent: Nov. 1, 2022

(54) METHOD AND DEVICE FOR RESETTING AN INERTIAL UNIT OF A TRANSPORT MEANS ON THE BASIS OF INFORMATION DELIVERED BY A VIEWFINDER OF THE TRANSPORT MEANS

(71) Applicant: SAFRAN ELECTRONICS & DEFENSE, Paris (FR)

(72) Inventor: Christian Lignon, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/614,232

(22) PCT Filed: May 25, 2020

(86) PCT No.: PCT/EP2020/064366
§ 371 (c)(1),
(2) Date: Nov. 24, 2021

(87) PCT Pub. No.: WO2020/244945
PCT Pub. Date: Dec. 10, 2020

(65) Prior Publication Data
US 2022/0205790 A1 Jun. 30, 2022

(30) Foreign Application Priority Data

Jun. 6, 2019 (FR) ..................................... 1905987

(51) Int. Cl.
*G01C 21/16* (2006.01)
*G01C 21/34* (2006.01)

(52) U.S. Cl.
CPC ....... *G01C 21/188* (2020.08); *G01C 21/3476* (2013.01)

(58) Field of Classification Search
CPC ... G01C 21/16; G01C 21/188; G01C 21/3476
See application file for complete search history.

(56) References Cited

U.S. PATENT DOCUMENTS 7,136,726 B2 * 11/2006 Greenfeld ............. F41G 7/2213
701/3
7,308,342 B2 * 12/2007 Greenfeld ............. G01C 11/02
701/3

(Continued)

OTHER PUBLICATIONS

Sep. 4, 2020 International Search Report issued in International Patent Application No. PCT/EP2020/064366.

*Primary Examiner* — Tung S Lau
(74) *Attorney, Agent, or Firm* — Oliff PLC (57) ABSTRACT

A method and a device resets an inertial unit of a transport on the basis of information delivered by a viewfinder of the transport. According to one embodiment: a horizontal velocity vector of the transport and coordinates of the transport are obtained from the inertial unit, a horizontal line of sight of the viewfinder is obtained on at least one landmark, coordinates of at least one landmark are obtained, an angle between the horizontal velocity vector and the horizontal line of sight is computed, the drift of the computed angle is computed, an error is computed on the basis of the obtained coordinates, the computed angle and its computed drift, and the computed error is transferred to a Kalman filter for filtering the error and resetting the inertial unit.

9 Claims, 5 Drawing Sheets

(56) References Cited

U.S. PATENT DOCUMENTS

| | | | | |
|---|---|---|---|---|
| 7,602,415 | B2* | 10/2009 | von Flotow | G01C 11/025 |
| | | | | 348/113 |
| 8,275,544 | B1* | 9/2012 | Wells | F41G 3/06 |
| | | | | 342/146 |
| 10,242,581 | B2* | 3/2019 | Rysdyk | G06T 7/246 |
| 2005/0060092 | A1* | 3/2005 | Hablani | G05D 1/12 |
| | | | | 701/472 |
| 2007/0129853 | A1* | 6/2007 | Greenfeld | G01C 11/02 |
| | | | | 701/3 |
| 2008/0211912 | A1* | 9/2008 | Greenfeld | G01C 11/02 |
| | | | | 701/3 |
| 2010/0283840 | A1* | 11/2010 | Belenkii | G01C 21/02 |
| | | | | 356/8 |
| 2015/0253150 | A1 | 9/2015 | Guillet et al. | |
| 2016/0341543 | A1* | 11/2016 | Jancic | G01C 3/08 |
| 2018/0218618 | A1* | 8/2018 | Rysdyk | B64C 39/024 |

* cited by examiner

METHOD AND DEVICE FOR RESETTING AN INERTIAL UNIT OF A TRANSPORT MEANS ON THE BASIS OF INFORMATION DELIVERED BY A VIEWFINDER OF THE TRANSPORT MEANS

TECHNICAL FIELD

The present invention relates to a method and a device for resetting an inertial unit of a transport means on the basis of information delivered by a viewfinder of the transport means.

PRIOR ART

A transport means, such as an aircraft, a land vehicle or a ship, typically uses an inertial unit for navigation. The inertial unit is able to integrate movements, such as acceleration and angular velocity, of the transport means to estimate its orientation (roll, pitch and heading angles), its linear velocity and its position. The position estimation is relative to the starting point or the last reset point used to update the position, speed and attitude estimation of the transport means.

An inertial navigation unit typically comprises an inertial core and, optionally, an inertial core support platform designed to hold the inertial core in an inertial frame of reference. The inertial core comprises inertial sensors such as gyroscopes and accelerometers arranged along the axes of a measurement frame. After estimating a geographical reference frame during the initial alignment operation, the gyroscopes measure angular rotations of the measurement frame relative to the geographical reference frame and provide the attitude of the transport means in the geographical reference frame. Accelerometers measure accelerations that are projected into the geographical reference frame, then corrected for the earth's gravitational field, then integrated once to provide velocity, then again to provide the position and update the geographical reference frame. The accuracy of an inertial unit depends directly on the errors of the inertial sensors, and in the case of long-term inertial navigation, the position errors depend predominantly on the accuracy of the gyroscopes. The accuracy of the gyroscopes is affected by drift errors, scale factor errors, and axis setting errors.

It is then necessary to reset the inertial unit.

The resetting of an inertial unit is performed to correct errors that accumulate during the navigation of the transport means. The reset is performed using an external source of information that takes measurements other than those taken by the inertial unit and using a filtering system such as a Kalman filter.

DESCRIPTION OF THE INVENTION

An object of the present invention is to propose a method and a device for resetting an inertial unit of a transport means on the basis of information delivered by a viewfinder of the transport means which does not use measurements of the distance between the transport means and a landmark. This avoids the use of radar-type means, which are generally based on the emission of electromagnetic or sound waves, and is therefore not so easily detectable by electromagnetic or sound wave detection means.

To this end, the present invention relates to a device for resetting an inertial unit of a transport means on the basis of information delivered by a viewfinder of the transport means, characterized in that the device comprises:
  means for obtaining from the inertial unit a horizontal velocity vector of the transport means and coordinates of the transport means,
  means for obtaining a horizontal line of sight from the viewfinder on at least one landmark,
  means for obtaining the coordinates of at least one landmark,
  means for computing an angle, in the horizontal plane, between the horizontal velocity vector and the horizontal line of sight,
  means for computing the drift of the computed angle,
  means for computing an error on the basis of the obtained coordinates, the computed angle and its computed drift,
  means for transferring the computed error to a Kalman filter for error filtering and resetting of the inertial unit.

The invention also relates to a method for resetting an inertial unit of a transport means on the basis of information delivered by a viewfinder of the transport means, characterized in that the method comprises the steps of:
  obtaining from the inertial unit a horizontal velocity vector of the transport means and coordinates of the transport means,
  obtaining a horizontal line of sight from the viewfinder on at least one landmark,
  obtaining coordinates of at least one landmark,
  computing an angle, in the horizontal plane, between the horizontal velocity vector and the horizontal line of sight,
  computing the drift of the computed angle,
  computing an error on the basis of the obtained coordinates, the computed angle and its computed drift,
  transferring the computed error to a Kalman filter for error filtering and resetting of the inertial unit.

Thus, it is possible to reset the inertial unit without having to know the distance separating the transport means from at least one landmark. This makes it possible to avoid using telemetry instruments, which are generally not very discreet, to reset the inertial unit.

According to a particular embodiment, the coordinates of the transport means are the latitude, longitude and altitude of the transport means and the coordinates of at least one landmark are the latitude and longitude of at least one landmark.

According to a particular embodiment, the inertial unit provides the viewfinder with the orientation of the transport means with respect to the geographical reference frame in order to allow the positioning of the line of sight in the horizontal plane.

According to a particular embodiment, the error is computed only if the computed drift is not equal to zero.

Thus, the present invention ensures that resetting is performed only under favorable conditions.

According to a particular embodiment, the drift is computed over a period of time between 0.1 and 10 seconds.

Thus, the accuracy of the reset is increased.

According to a particular embodiment, the error is computed according to the following formula:

$$\varepsilon = \begin{pmatrix} Lo \\ La \end{pmatrix} - \begin{pmatrix} Lo_{amer} \\ La_{amer} \end{pmatrix} + \frac{\sin\theta}{(R_{Terre} + z_g)\theta'} \left( \cos\theta_i \begin{pmatrix} V_{xg} \\ V_{yg} \end{pmatrix} + \sin\theta_i \begin{pmatrix} -V_{yg} \\ V_{xg} \end{pmatrix} \right),$$

where $\theta$ is the computed angle, $\theta'$ is the drift of $\theta$, $V_{xg}$, $V_{yg}$ are the coordinates of the horizontal velocity vector of the transport means, $z_g$ is the altitude of the transport means, Lo, La are the latitude and longitude of the transport means, and $Lo_{amer}$, $La_{amer}$ are the latitude and longitude of a landmark.

The invention also relates to an aircraft characterized in that it comprises the device for resetting an inertial unit.

The invention also relates to a ship characterized in that it comprises the device for resetting an inertial unit.

The invention also relates to a submarine characterized in that it comprises the device for resetting an inertial unit.

The invention also relates to computer programs stored on an information carrier, said programs comprising instructions for implementing the previously described methods when loaded and run by a computer system.

BRIEF DESCRIPTION OF THE DRAWINGS

The above-mentioned and other features of the invention will become clearer upon reading the following description of an exemplary embodiment, said description being provided in conjunction with the accompanying drawings, in which.

DETAILED DESCRIPTION OF EMBODIMENTS

Figure 1:
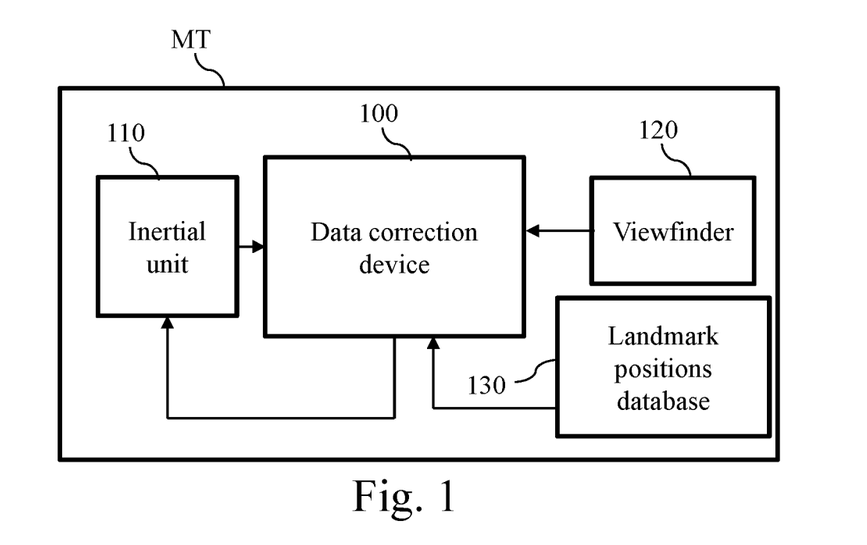
FIG. 1 shows a transport means in which the present invention is implemented.

FIG. 1 shows a transport means in which the present invention is implemented.

The transport means MT is, for example, an aircraft, a land vehicle, a submarine or a ship.

The transport means MT comprises an inertial unit 110, a viewfinder 120, a landmark positions delivery module 130, and a reset device 100.

The inertial unit 110 comprises inertial sensors such as gyroscopes and accelerometers arranged along the axes of the measurement frame. The gyroscopes measure angular rotations of the measurement frame relative to a geographical reference frame and provide the attitude of the transport means MT in the geographical reference frame. The accelerometers measure accelerations which are projected into the geographical reference frame, then corrected for the earth's gravitational field, then integrated once to provide the velocity, then a second time to provide the position.

The inertial unit 110, according to the present invention, is reset by a reset device 100, inter alia, on the basis of a viewing vector of a landmark, or horizontal line of sight, provided by the viewfinder 120, from the position of the landmark provided by the landmark positions delivery module 130 and on the basis of the horizontal velocity vector of the transport means MT measured by the inertial unit 110.

The viewfinder 120, or viewing head, is locked on the position of at least one landmark. The locking on the position of at least one landmark is carried out on the basis of gyrometric information provided by a gyrometric trihedron integral with the line of sight. The line of sight is locked on a part of the images captured by an image capture device not shown in FIG. 1.

In the case of a submarine, the viewfinder 120 may be a passive sonar that provides an underwater and coastal representation of sound emissions in which particular emission points can be identified, taking on the role of landmarks seen by the optical viewfinder of an aircraft or ship.

According to a particular embodiment, the viewfinder is connected to the landmark positions delivery module 130.

Figure 2:
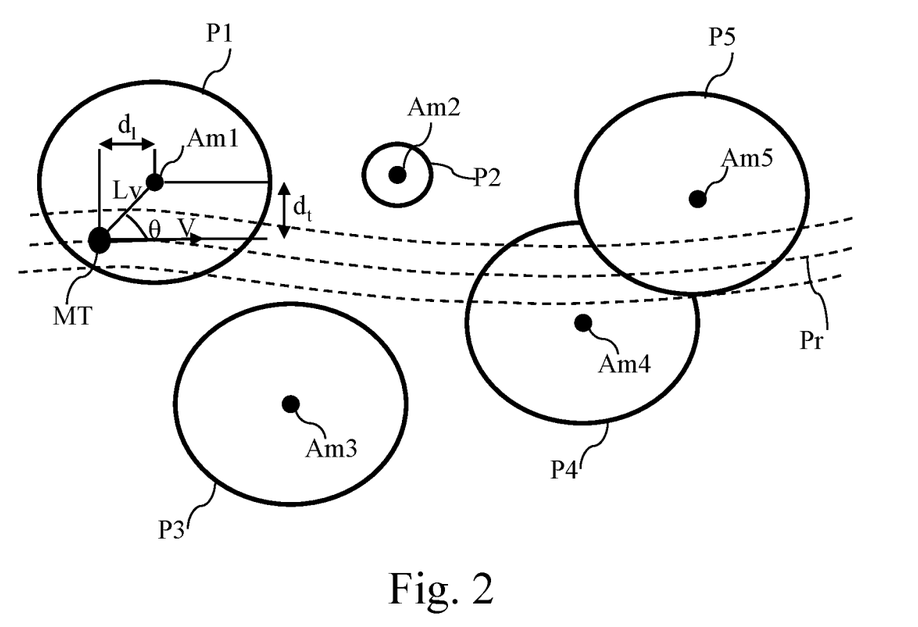
FIG. 2 is an example of a projection in a horizontal plane of a navigation of a transport means along a route on which there are placed landmarks.

FIG. 2 is an example of a projection in a horizontal plane of a navigation of a transport means along a route on which landmarks are placed.

The transport means MT travels a route Pr along which there are arranged landmarks Am1 to Am5 of which the position is known and stored in the landmark positions delivery module 130. When one or more landmarks are within range of the transport means MT, the viewing head points at the landmark or landmarks when the transport means is within the detection perimeter of the landmark or landmarks.

The landmarks Am1 to Am5 are for example coastal lighthouses for maritime navigation, geographical landmarks for air navigation.

The detection perimeters of the landmarks Am1 to Am5 are denoted P1 to P5, respectively, in FIG. 2.

The azimuth, or heading, is the angle in the horizontal plane between the direction of the transport means MT and a reference direction, such as north.

In the example of FIG. 2, the viewing head 120 points at the landmark Am1 along a line of sight projected in the horizontal plane Lv.

Figure 3:
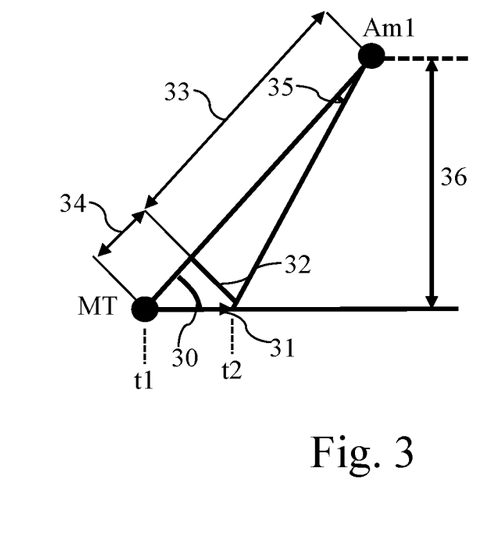
FIG. 3 is an example of information obtained at two different times during the route of the transport means.

In FIG. 2, the transverse horizontal distance $d_t$ orthogonal to the horizontal velocity V between the transport means MT and the landmark Am1 and the longitudinal horizontal distance $d_1$ according to the horizontal velocity V between the transport means MT and the landmark Am1 are shown. These distances, according to the present invention, are not known. FIG. 3 is an example of information obtained at two different times t1 and t2 during the route of the transport means MT.

The distance traveled along $d_1$ in the longitudinal plane between times t1 and t2 is denoted 31 and is equal to $V \cdot \Delta t$.

The distance $d_t$ in the horizontal plane perpendicular to V is denoted 36 in FIG. 3 and is equal to $V \cdot \Delta t \cdot \sin \theta / \tan \Delta\theta$, where θ denoted 30 in FIG. 3 is the angle between the horizontal velocity vector V of the transport means and the horizontal line of sight Lv, Δθ denoted 35 in FIG. 3 is the difference between the angles θ determined at times t1 and t2.

The distance denoted 32 in FIG. 3 is equal to $V \cdot \Delta t \cdot \sin \theta$, and the sum of the distances denoted 33 and 34 is the distance separating the transport means MT from the landmark Am1 at time t1.

If we consider Δt to be small, for example equal to 1 second, the part denoted 34 in FIG. 3 can be considered negligible and it is possible to formulate $d_t$ and $d_1$ as follows:

$$d_t = (V \cdot \sin^2(\theta))/d\theta/dt$$

$$d_1 = (V \cdot \sin(\theta) \cdot \cos(\theta))/d\theta/dt$$

These equations make it possible to define a processing used in accordance with the present invention to provide an error to a navigation filter and to reset the inertial unit 110 as described hereinafter with reference to FIG. 4.

Figure 4:
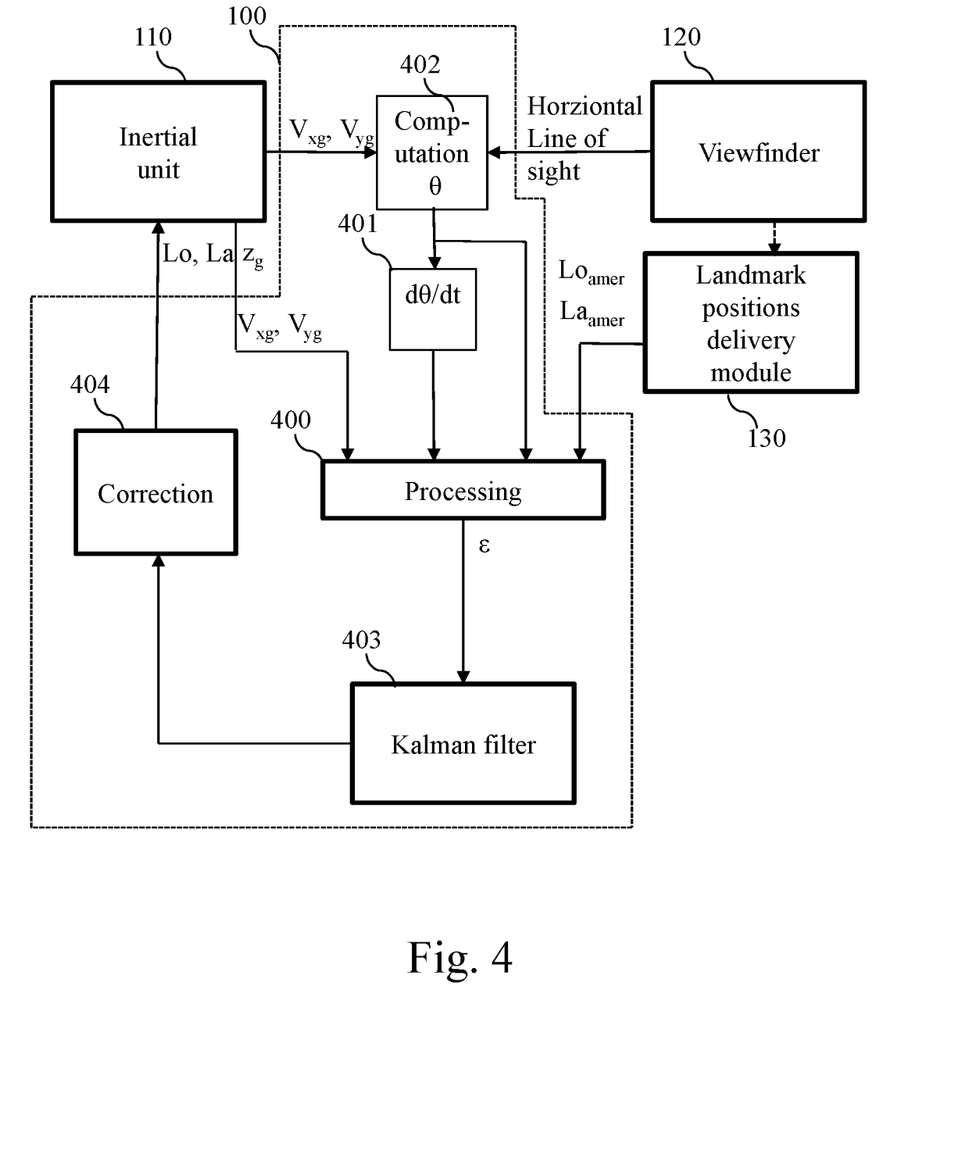
FIG. 4 is an example of a system for resetting an inertial unit of a transport means on the basis of information delivered by a viewfinder of the transport means according to the present invention.

FIG. 4 is an example of a system for resetting an inertial unit of a transport means on the basis of information delivered by a viewfinder of the transport means according to the present invention.

The reset system comprises the inertial unit 110, the viewfinder 120, the landmark positions delivery module 130 and the reset device 100.

The reset device 100 comprises a module 402 for computing an angle θ between the horizontal velocity vector V and the line of sight in the horizontal plane Lv, a module 401 for computing the drift of the angle θ, a processing module 400, a Kalman filter 403 and a correction module 404.

The module 402 for computing the angle θ receives from the inertial unit 110 only the coordinates of the horizontal velocity vector ($V_{xg}$, $V_{yg}$) of the transport means MT and the coordinates of the line of sight in the horizontal plane Lv. The computing module determines the angle θ on the basis of the coordinates.

The angle θ is provided to the computing module 401 and the processing module 400. The computing module 401 determines the drift θ' or dθ/dt of the angle θ and provides this to the processing module 400.

The inertial unit 110 provides the processing module 400 with the coordinates of the transport means MT, which are the altitude, the longitude Lo, the latitude La and the coordinates of the horizontal velocity vector ($V_{xg}$, $V_{yg}$) of the transport means MT.

According to a particular mode, the inertial unit 110 provides the orientation of the transport means MT with respect to the geographical reference frame to the viewfinder 120 in order to allow the positioning of the line of sight in the horizontal plane.

The landmark positions delivery module 130 provides the processing module with the latitude $La_{amer}$ and longitude $Lo_{amer}$ of the landmark viewed by the viewfinder 120.

The landmark positions delivery module 130 comprises a set of landmarks of which the position is known, and, in a particular embodiment, a set of so-called ephemeral landmarks of which the position is determined by the landmark positions delivery module, as will be described with reference to FIG. 6.

According to the present invention, the processing module 400 determines an error of the inertial unit on the basis of the various information items received, according to the following formula:

$$\varepsilon = \begin{pmatrix} Lo \\ La \end{pmatrix} - \begin{pmatrix} Lo_{amer} \\ La_{amer} \end{pmatrix} + \frac{\sin\theta}{(R_{Terre} + z_g)\theta'}\left(\cos\theta, \begin{pmatrix} V_{xg} \\ V_{yg} \end{pmatrix} + \sin\theta, \begin{pmatrix} -V_{yg} \\ V_{xg} \end{pmatrix}\right),$$

where $R_{Terre}$ is the radius of the earth.

Specifically, the processing module determines the error only if the drift of the angle is not equal to zero.

The error of the inertial unit 110 is fed into the Kalman filter 403. The Kalman filter 403 is a conventional filter that estimates the states of a dynamic system on the basis of a series of noisy measurements.

The correction provided by the Kalman filter 403 is shaped by the correction module 404 to adapt the correction to the inertial unit and to reset same.

It should be noted here that the drift dθ/dt is computed by the computational module 401 over a period of time between 0.1 seconds for an aircraft and 10 seconds for a ship.

Furthermore, the present invention is particularly suitable for situations in which the transport means MT is at a speed of more than 10 km/h and follows a trajectory with heading variations of +/−20°.

Thus, the present invention performs a reset of the inertial unit 110 on the basis of the rotational speed of the transport means MT measured about the vertical axis of the inertial unit 110 and the rotational speed of the horizontal line of sight measured about the vertical axis by the gyroscopes of the viewfinder 120 or more generally by means integrated in the viewfinder 120.

If there are no specific means integrated in the viewfinder allowing the computing of the orientation of the line of sight in the horizontal plane, for example when there is a joint between the inertial unit 110 and the viewfinder 120, the angular value of the joint is for example determined as described in patent FR3000219.

The present invention is also applicable when multiple landmarks Am are viewed by the viewfinder 120. For example, the processing performed by the processing module 100 is performed successively for each landmark or the reset device is duplicated a predetermined number of times.

Figure 5:
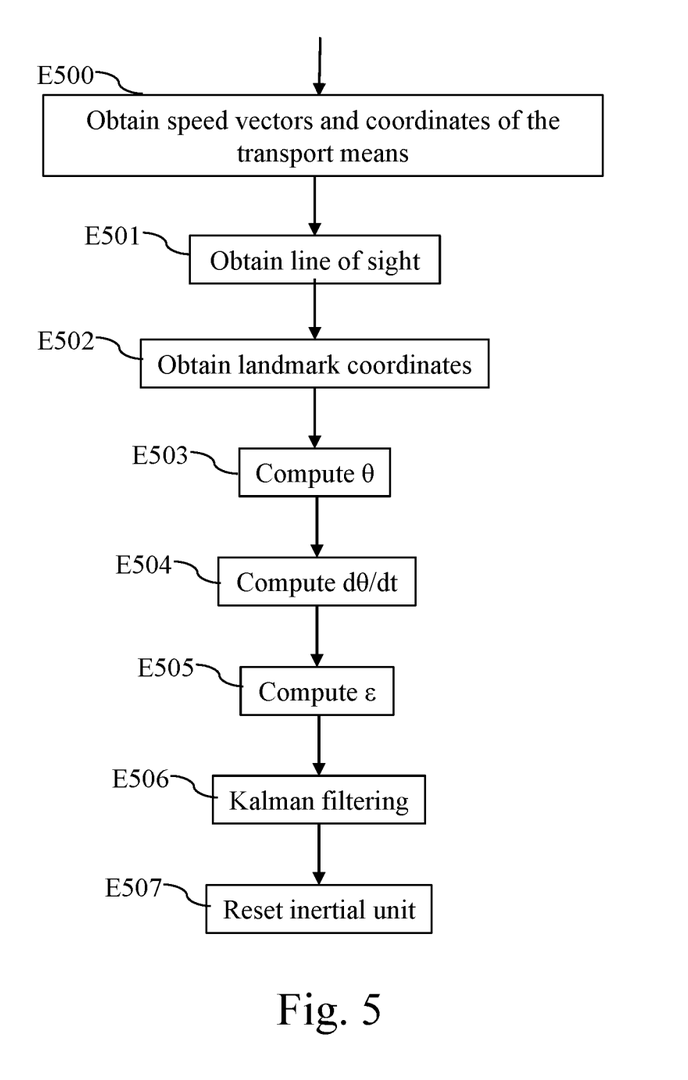
FIG. 5 shows an example of an algorithm for resetting an inertial unit of a transport means on the basis of information delivered by a viewfinder of the transport means according to the present invention.

FIG. 5 shows an example of an algorithm for resetting an inertial unit of a transport means on the basis of information provided by a viewfinder of the transport means according to the present invention.

In step E500, the reset device 100 of the inertial unit 110 obtains from the inertial unit a horizontal velocity vector of the transport means and the coordinates of the transport means.

In step E501, the reset device 100 obtains the horizontal line of sight from the viewfinder 120 to at least one landmark.

In step E502, the reset device 100 obtains the coordinates of at least one landmark.

In step E503, the reset device 100 computes an angle between the horizontal velocity vector and the line of sight in the horizontal plane.

In step E504, the reset device 100 computes the drift of the computed angle.

In step E505, the reset device 100 computes the error on the basis of the obtained coordinates, the computed angle and its computed drift.

In step E506, the reset device 100 transfers the computed error to the Kalman filter for error filtering.

In step E507, the inertial unit 110 is reset.

Figure 6:
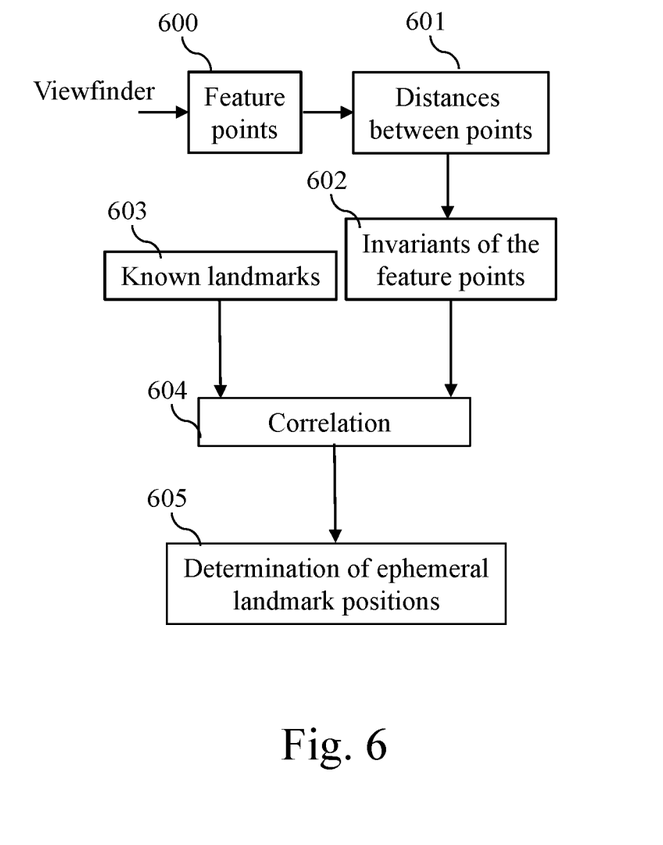
FIG. 6 shows an architecture of a landmark positions delivery module according to a particular embodiment of the present invention.

FIG. 6 shows an architecture of a landmark positions delivery module according to a particular embodiment of the present invention.

The landmark positions delivery module 130 comprises a database of known landmark positions 603 that is populated from images delivered by the image capture device of the viewfinder 120.

The landmark positions delivery module 130 comprises means 600 for detecting feature points PC in the images delivered by the image capture device of the viewfinder 120. The feature points PC i and j, where i is the index of a first feature point and j is the index of a second feature point, have unknown positions and velocities $V_i$−V and $V_j$−V with respect to the transport means.

The landmark positions delivery module 130 comprises means 601 for determining distances between the feature points PC.

Posing the equation of the distance between the two feature points PC i and j, denoted $D_{ij}$, in which θi is defined with respect to the horizontal velocity vector V−V$_i$ and θ$_j$ is defined with respect to the horizontal velocity vector V−Vj, gives:

$$Dij = \sqrt{\left(\|V-V_i\|\frac{\sin\theta_i\cos\theta_i}{\theta_i} - \|V-V_j\|\frac{\sin\theta_j\cos\theta_j}{\theta_j}\right)^2 + \left(\|V-V_i\|\frac{\sin^2\theta_i}{\theta_i} - \|V-V_j\|\frac{\sin^2\theta_j}{\theta_j}\right)^2},$$

The landmark positions delivery module 130 comprises means 602 for determining invariants in the feature points. In the case where the feature points PC i and j have the same velocity with respect to the transport means MT, i.e., when V−V$_i$=V−V$_j$, this gives:

$$Dij = \|V-V_i\|\sqrt{\left(\frac{\sin\theta_i\cos\theta_i}{\theta_i} - \frac{\sin\theta_j\cos\theta_j}{\theta_j}\right)^2 + \left(\frac{\sin^2\theta_i}{\theta_i} - \frac{\sin^2\theta_j}{\theta_j}\right)^2} = \|V-V_i\|\sqrt{k_{ij}}$$

$$k_{ij} = \left(\frac{\sin\theta_i\cos\theta_i}{\theta_i} - \frac{\sin\theta_j\cos\theta_j}{\theta_j}\right)^2 + \left(\frac{\sin^2\theta_i}{\theta_i} - \frac{\sin^2\theta_j}{\theta_j}\right)^2$$

When the transport means MT is at constant speed, the stability of the value of the coefficient k$_{i,j}$, during a given time, is chosen as a criterion to determine if the feature points PC i and j probably belong to the same family of feature points, i.e., probably belong to the same object in translation at the speed V−V$_1$ with respect to the transport means MT.

The means 602 for determining invariants in the feature points follow the variations of the coefficient k$_{ij}$ during voluntary variations of heading and/or speed resulting in the variation of the quantity V−V$_i$.

The means 602 for determining invariants form a set of feature points maintaining the value of the coefficients k$_{ij}$ during the variations of heading at constant speed and/or having variations of the square root of k$_{ij}$ inversely proportional to the norm of V.

The invariant points correspond to feature points that are related to the land, such as mountain peaks, roads, road signs, or particular features of the sea coast. Based on this set of points, it is then possible to compute the distances between each pair of feature points according to the following formula:

$$D_{ij}(=V\sqrt{k_{ij}})$$

and also to compute the distances d$_f$ and d$_r$.

It is then possible to create a map of the observed feature points assumed to be related to the land with respect to the position of the transport means MT.

The landmark positions delivery module 130 comprises means 604 for correlating known landmark positions stored in a known landmarks database 603 with the formed set of feature points.

The correlation means 604 identify the feature points of the formed set that have a position stored in the database 603.

The module for providing positions of landmarks 130 comprises means 605 for determining positions of so-called ephemeral landmarks. The means 605 for determining positions of ephemeral landmarks determine, on the basis of the positions of the identified points, the positions of the other feature points of the formed set. These other feature points of the formed set are said to be ephemeral because they are likely to be deleted in time. These determined positions supplement the database 603.

The invention claimed is:

1. A device configured for resetting an inertial unit of a transport on the basis of information delivered by a viewfinder of the transport wherein the device comprises circuitry configured to perform:

obtaining from the inertial unit a horizontal velocity vector of the transport and coordinates of the transport, obtaining a horizontal line of sight from the viewfinder on at least one landmark, obtaining coordinates of said at least one landmark, computing an angle between the horizontal velocity vector and the horizontal line of sight, computing the drift of the computed angle, computing an error of the inertial unit on the basis of the obtained coordinates, the computed angle and its computed drift, the error of the inertial unit being computed according to the following formula:

$$\varepsilon = \begin{pmatrix}Lo\\La\end{pmatrix} - \begin{pmatrix}Lo_{amer}\\La_{amer}\end{pmatrix} + \frac{\sin\theta}{(R_{Terre}+z_g)\theta'}\left(\cos\theta_i\begin{pmatrix}V_{xg}\\V_{yg}\end{pmatrix} + \sin\theta_i\begin{pmatrix}-V_{yg}\\V_{xg}\end{pmatrix}\right),$$

where θ is the computed angle, θ' is the drift of θ, V$_{xg}$, V$_{yg}$ are the coordinates of the horizontal velocity vector of the transport, z$_g$ is the altitude of the transport, Lo, La are the latitude and longitude of the transport, and Lo$_{amer}$, La$_{amer}$ are the latitude and longitude of a landmark, and transferring the computed error of the inertial unit to a Kalman filter for error filtering and resetting of the inertial unit.

2. The device as claimed in claim 1, wherein the error is computed only if the computed drift is not equal to zero.

3. The device as claimed in claim 2 wherein the drift is computed over a time period between 0.1 and 10 seconds.

4. The device as claimed in claim 1, wherein the inertial unit provides the viewfinder with the orientation of the transport with respect to the geographical reference for positioning the line of sight in the horizontal plane.

5. The device as claimed in claim 1, wherein the coordinates of at least one landmark are stored in a database storing known landmark positions and landmark positions determined from images delivered by a viewfinder image capture device.

6. An aircraft comprising the device for resetting an inertial unit as claimed in claim 1.

7. A vessel comprising the device for resetting an inertial unit as claimed in claim 1.

8. A submarine comprising the device for resetting an inertial unit as claimed in claim 1.

9. A method comprising:

for resetting an inertial unit of a transport on the basis of information delivered by a viewfinder of the transport, wherein the method comprising:

obtaining from the inertial unit a horizontal velocity vector of the transport and coordinates of the transport, obtaining a horizontal line of sight from the viewfinder on at least one landmark, obtaining coordinates of said at least one landmark, computing an angle between the horizontal velocity vector and the horizontal line of sight, computing the drift of the computed angle, computing an error of the inertial unit on the basis of the obtained coordinates, the computed angle and its computed drift, of the inertial unit on the basis of the obtained coordinates, the computed angle and its computed drift, the error of the inertial unit being computed according to the following formula:

$$\varepsilon = \begin{pmatrix} Lo \\ La \end{pmatrix} - \begin{pmatrix} Lo_{amer} \\ La_{amer} \end{pmatrix} + \frac{\sin\theta}{(R_{Terre} + z_g)\theta'}\left(\cos\theta, \begin{pmatrix} V_{xg} \\ V_{yg} \end{pmatrix} + \sin\theta, \begin{pmatrix} -V_{yg} \\ V_{xg} \end{pmatrix}\right),$$

where $\theta$ is the computed angle, $\theta'$ is the drift of $\theta$, $V_{xg}$, $V_{yg}$ are the coordinates of the horizontal velocity vector of the transport, $z_g$ is the altitude of the transport, Lo, La are the latitude and longitude of the transport, and $Lo_{amer}$, $La_{amer}$ are the latitude and longitude of a landmark, and transferring the computed error of the inertial unit to a Kalman filter for error filtering and resetting of the inertial unit.

\* \* \* \* \*